Jan. 11, 1927.
K. AWOKI
1,614,338
SAUCER
Original Filed Jan. 27, 1923
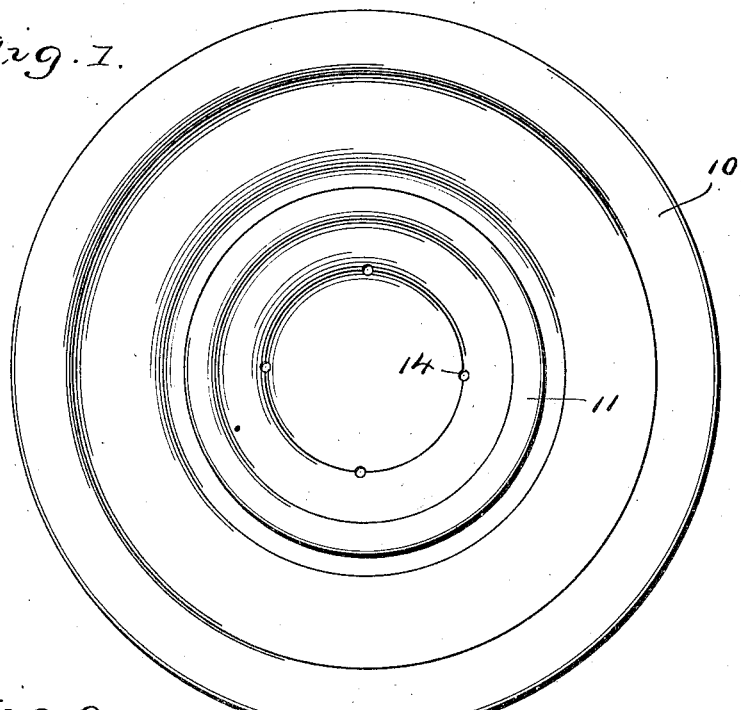
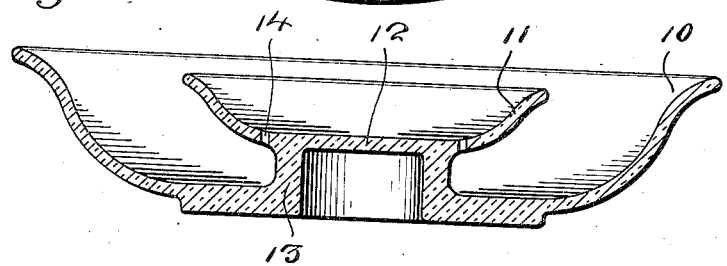
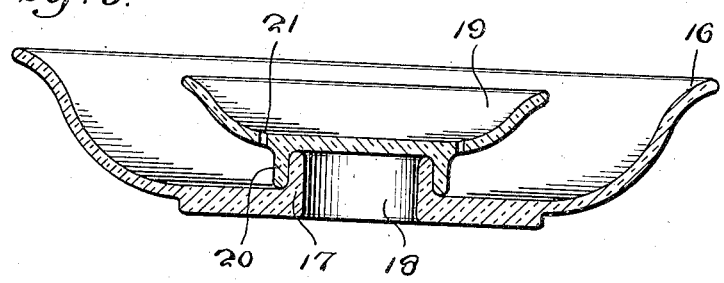
Kametaro Awoki
INVENTOR
BY Victor J. Evans
ATTORNEY
WITNESS:
E. Q. Ruppert.

Patented Jan. 11, 1927.

1,614,338

UNITED STATES PATENT OFFICE.

KAMETARO AWOKI, OF NEW YORK, N. Y.

SAUCER.

Application filed January 27, 1923, Serial No. 615,377. Renewed June 4, 1926.

This invention relates to dishes and has for its object the provision of a novel saucer of double construction designed to be used in connection with an ordinary cup to replace the ordinary saucer, the device including outer and inner saucer members with the inner member formed with passages or holes to permit draining out of any liquid which may be spilled from the cup, the great advantage being that the spilt liquid by draining away will not remain on the cup and be dropped from the cup onto the table or table cloth while the cup is being carried to the user's lips.

An additional object is the provision of a device of this character which may be a single integral structure, or which may be constructed in two parts, and which will be simple and inexpensive to manufacture, easy to keep clean, efficient and durable in service and a general improvement in the art.

With the above and other objects and advantages in view the invention consists in the details of construction to be hereinafter more fully described and claimed and illustrated in the accompanying drawings, in which:

Figure 1 is a plan view of the dish,

Figure 2 is a cross section therethrough,

Figure 3 is a cross section showing a modified form.

Referring more particularly to the drawings, and especially Figures 1 and 2 I have shown a saucer as being one single piece of china, porcelain, crockery or the like and including an outer bowl portion 10 and a considerably smaller inner bowl portion 11 which has its bottom 12 supported considerably above the bottom of the outer member by a pedestal 13 which is formed hollow as shown for the sake of lightness. The bottom portion of the inner member is formed with any desired number of holes 14 which will act to drain any liquid within the inner member into the outer member.

In the use of the device it is intended that it replace the ordinary saucer and that a cup containing coffee, tea or any other beverage be placed within the inner member 11. In case the liquid within the cup is spilled from any cause it will naturally flow into the inner bowl member 11 but cannot remain therein as it will drain out through the holes 14 into the outer member. In this way the liquid is prevented from accumulating on the bottom of the cup so that when the cup is subsequently carried to a person's lips, there will be no liquid to drop from the cup onto the table cloth.

In Figure 3 I have shown a modified form of the device which instead of being constructed as an integral structure is formed of two parts which may be separated for convenience in washing. In this form I have shown the outer bowl member 16 as provided at the upper side of its bottom with a cylindrical projection 17 which is hollow. In other words the bottom of the outer member is formed with a hole 18 which extends entirely through the projection 17. Located within the outer member is the inner bowl 19 which is formed with a depending flange 20 engaging exteriorly upon the extension 17. The bottom of this inner member or bowl is formed with a series of perforations 21 located outwardly of the flange 20 for the purpose of draining out any liquid spilled in the inner bowl. The use of this form of the device is of course the same as the use of the first described form but it has the advantage of being more easily cleaned inasmuch as the two parts may be disconnected or separated whenever it is so desired.

From the foregoing description and a study of the drawings it will be apparent that I have thus provided a simply constructed and inexpensive dish for the purpose specified which will be efficient, easily kept clean, and which may, like any other dish be made as attractive and ornamental as do sired.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

A saucer comprising an outer member formed centrally of its bottom with an upstanding cylindrical projection, and an inner member located within the outer member and formed at its bottom with a depending cylindrical flange engaging exteriorly upon the upstanding flange of the outer member, the inner member being formed with perforations located outwardly of the flange thereon.

In testimony whereof I affix my signature.

KAMETARO AWOKI.